US012494102B1

(12) United States Patent
Christenbery

(10) Patent No.: US 12,494,102 B1
(45) Date of Patent: Dec. 9, 2025

(54) RARE COIN IDENTIFYING MACHINE

(71) Applicant: David Christenbery, Charlotte, NC (US)

(72) Inventor: David Christenbery, Charlotte, NC (US)

( * ) Notice: Subject to any disclaimer, the term of this patent is extended or adjusted under 35 U.S.C. 154(b) by 647 days.

(21) Appl. No.: 17/903,141

(22) Filed: Sep. 6, 2022

(51) Int. Cl.

| | |
|---|---|
| ***G07D 3/12*** | (2006.01) |
| ***G07D 3/02*** | (2006.01) |
| ***G07D 3/14*** | (2006.01) |
| ***G07D 5/00*** | (2006.01) |
| ***G07D 9/00*** | (2006.01) |
| ***G07D 9/06*** | (2006.01) |

(52) U.S. Cl.
CPC ............... *G07D 3/125* (2013.01); *G07D 3/02* (2013.01); *G07D 3/128* (2013.01); *G07D 3/14* (2013.01); *G07D 5/005* (2013.01); *G07D 9/008* (2013.01); *G07D 9/06* (2013.01); *G07D 2201/00* (2013.01); *G07D 2205/00* (2013.01)

(58) Field of Classification Search
CPC .......... G07D 5/005; G07D 3/02; G07D 3/128; G07D 3/14; G07D 9/008; G07D 9/06; G07D 2201/00; G07D 2205/00
USPC ........... 453/6, 10, 12, 13, 33–35, 49, 57, 61; 194/328, 346
See application file for complete search history.

(56) References Cited

U.S. PATENT DOCUMENTS 3,286,805 A 11/1966 New
4,088,144 A 5/1978 Zimmermann
4,361,161 A * 11/1982 Johnson .................... G07F 5/24 194/346
5,076,414 A 12/1991 Kimoto
5,492,212 A * 2/1996 Fillod ...................... G07F 1/047 453/3
5,494,145 A 2/1996 Cohrs et al.
6,082,518 A 7/2000 Itako et al.
7,004,299 B2 2/2006 Eich et al.
7,244,175 B2 * 7/2007 Adams ................... G07D 9/008 453/57
7,290,645 B2 11/2007 Hill et al.
7,874,478 B2 1/2011 Molbak
9,443,367 B2 9/2016 Baltazar
D871,498 S 12/2019 Kim
2002/0187740 A1 * 12/2002 Perkitny .................. G07D 3/08 453/6
2004/0035672 A1 * 2/2004 Fletcher .................... G07F 5/24 194/302
2004/0168881 A1 * 9/2004 Eich ....................... G07D 5/005 194/328
2006/0281397 A1 * 12/2006 Sanchis Franch ....... G07D 1/00 453/12

(Continued)

FOREIGN PATENT DOCUMENTS

EP 1437691 7/2004

*Primary Examiner* — Jeffrey A Shapiro

(57) ABSTRACT

The rare coin identifying machine is a coin sorting machine with integrated scanner interconnected to a CPU to identify collectible rare coins. The purpose being to automate the rarity identification for both avid coin collectors and novice. This automation will help alleviate human error in rare coin identification and the time needed to access them. The scanner inside the coin sorting machine scans coins one at a time and the CPU crosschecks database to see if a rare coin match occurs. If one does occur, then the coin exists the machine. If one does not occur, then the coin is routed to the proper stack.

15 Claims, 8 Drawing Sheets

(56) References Cited

U.S. PATENT DOCUMENTS

| | | | | |
|---|---|---|---|---|
| 2015/0101907 | A1* | 4/2015 | Hall | G07D 5/04<br>194/339 |
| 2015/0302678 | A1* | 10/2015 | Blake | G07D 9/06<br>453/62 |

* cited by examiner

RARE COIN IDENTIFYING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention generally relates to coin-sorting machines. More particularly, this invention relates to an improved coin-sorting machine that has a scanner and central processing unit ("CPU") that scans every inserted coin and determines if a coin in circulation is considered a rare collectible ("rare" or "collectible").

Coin sorters are a device that sorts a random collection of coins into stacks or tubes for various denominations. Most coin sorters also include an LCD screen that automatically keeps track of the coin amount that goes through the machine at every use. However, this amount only takes into consideration the circulation value of the coin. Another consideration includes what a coin collector may value a certain coin. Over the millennia, collecting items has evolved from the need of survival into a hobby for both personal edification in an entertaining kind of way and value-generating pastime. Coin collection is one of the most widely known and participated hobbies. The result being that if a rare coin is processed in the coin sorting machine, the total amount would be less then what person could get if they sold the rare coin to a collector.

With the possibility of coins being worth more in value, people are incentivized to access their coins and try to determine if their coins are valuable or collectible. But circulated coins have multiple factors that can make it rare but can be difficult to find and take a long time depending on how many coins they have. The rarity of the coin is based on the mintage, error on the coins, condition, etc., that hard to determine if the person is not an expert on what to look for and have the time to do so.

Current coin sorters and counters, such as Coinstar machines, differentiate the coins based on their own unique diameter and thickness. Mixed coin counters use automated sensors and rotating discs to identify coins based on their size and funnel them into separate cups. However, these automated sensors are only used to determine the coin's circulation value. No current coin sorting machines have a process to determine the rarity of a coin.

There are current apps that are more advanced in coin identification that helps coin collectors determine the rarity of a coin. The Coinoscope App is the only widely credited app that has a great accuracy on identifying coins and providing information on their rarity, characteristics, etc. However, this app is mainly used by avid coin collectors who can spend a lot of time researching their coins. People who are not avid collectors and cannot spend a lot of time researching their coins will not use an app like this. Apps like this requires the user to actively take pictures of the coins so that app can cross reference the coin with its data base. But the app only gives the information about the coin to the user, and it will be up to look over the information leading to human error on determining if a coin is a collectible.

The present invention is a passive method on identifying rare coins while sorting any coins that are not rare. Thus, just as a coin sorter automates a human role by being able to tell coins apart, the invention automates rare coin identification while alleviating human error in the process. No current coin sorting machine incorporates a rare coin identifying feature.

SUMMARY OF INVENTION

The present invention operates as a coin sorting machine but adds a scanner interconnected to a CPU to identify collectible rare coins. The purpose being to automate the rarity identification for both avid coin collectors and novice. This automation will help alleviate human error in rare coin identification and the time needed to access them. The scanner inside the coin sorting machine scans coins one at a time and the CPU crosschecks database to see if a rare coin match occurs. If one does occur, then the coin exists the machine. If one does not occur, then the coin is routed to the proper stack. The invention tells the monetary amount of the coins without considering the rare coins it identified and has dispensed.

Other advantages of the present invention will become apparent from a perusal of the following detailed description of the presently preferred embodiments of the invention.

It is an object of the present invention to address the deficiencies of the prior art discussed above and to do so in an efficient manner.

These together with additional objects, features and advantages of the rare coin identifying machine will be readily apparent to those of ordinary skill in the art upon reading the following detailed description of the presently preferred, but nonetheless illustrative, embodiments when taken in conjunction with the accompanying drawings.

In this respect, before explaining the current embodiments of the rare coin identifying machine in detail, it is to be understood that the rare coin identifying machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rare coin identifying machine.

It is therefore important that the claims be regarded as including such equivalent construction insofar as they do not depart from the spirit and scope of the rare coin identifying machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
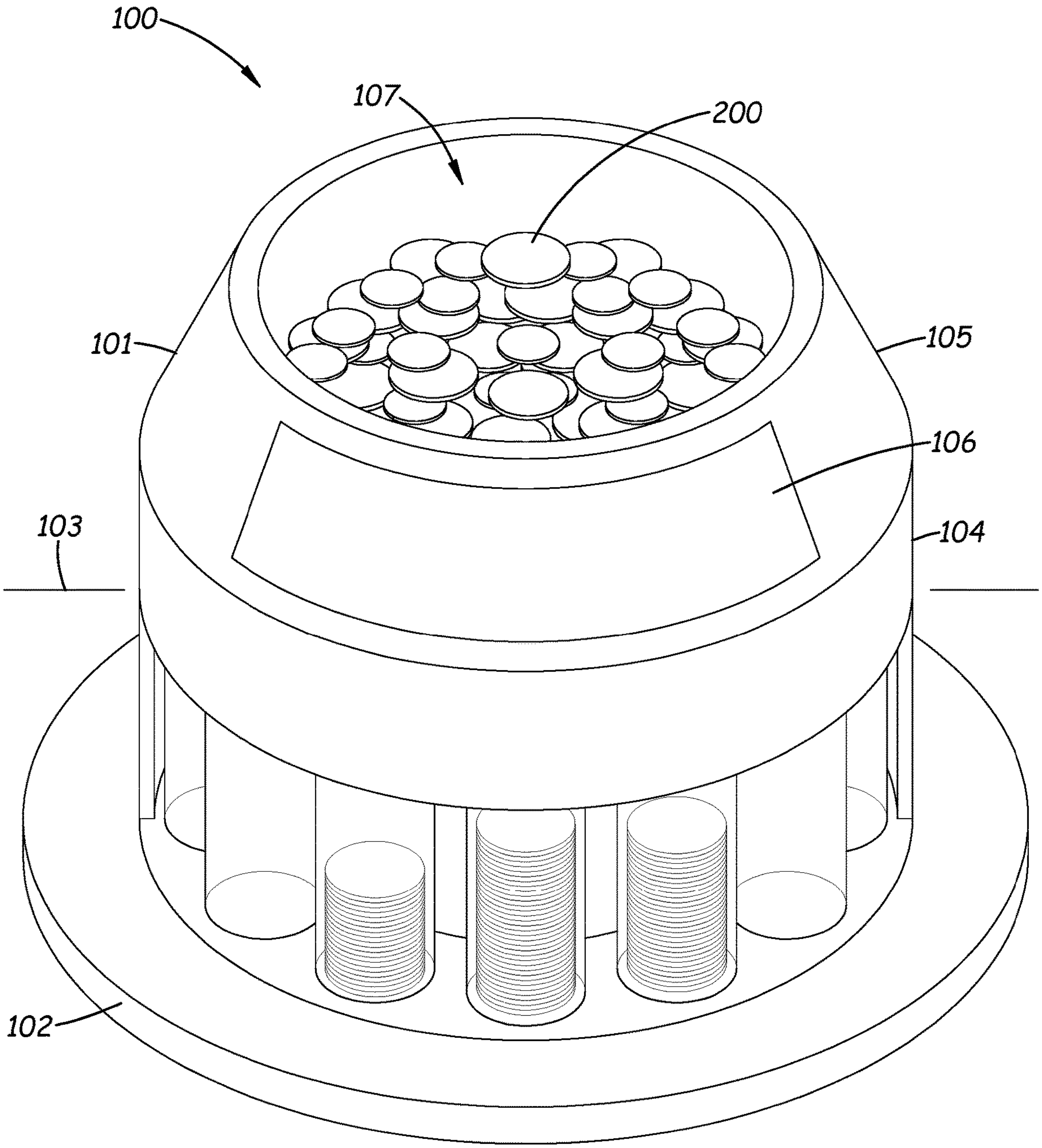
FIG. 1 is a perspective view of an embodiment of the disclosure.
Figure 2:
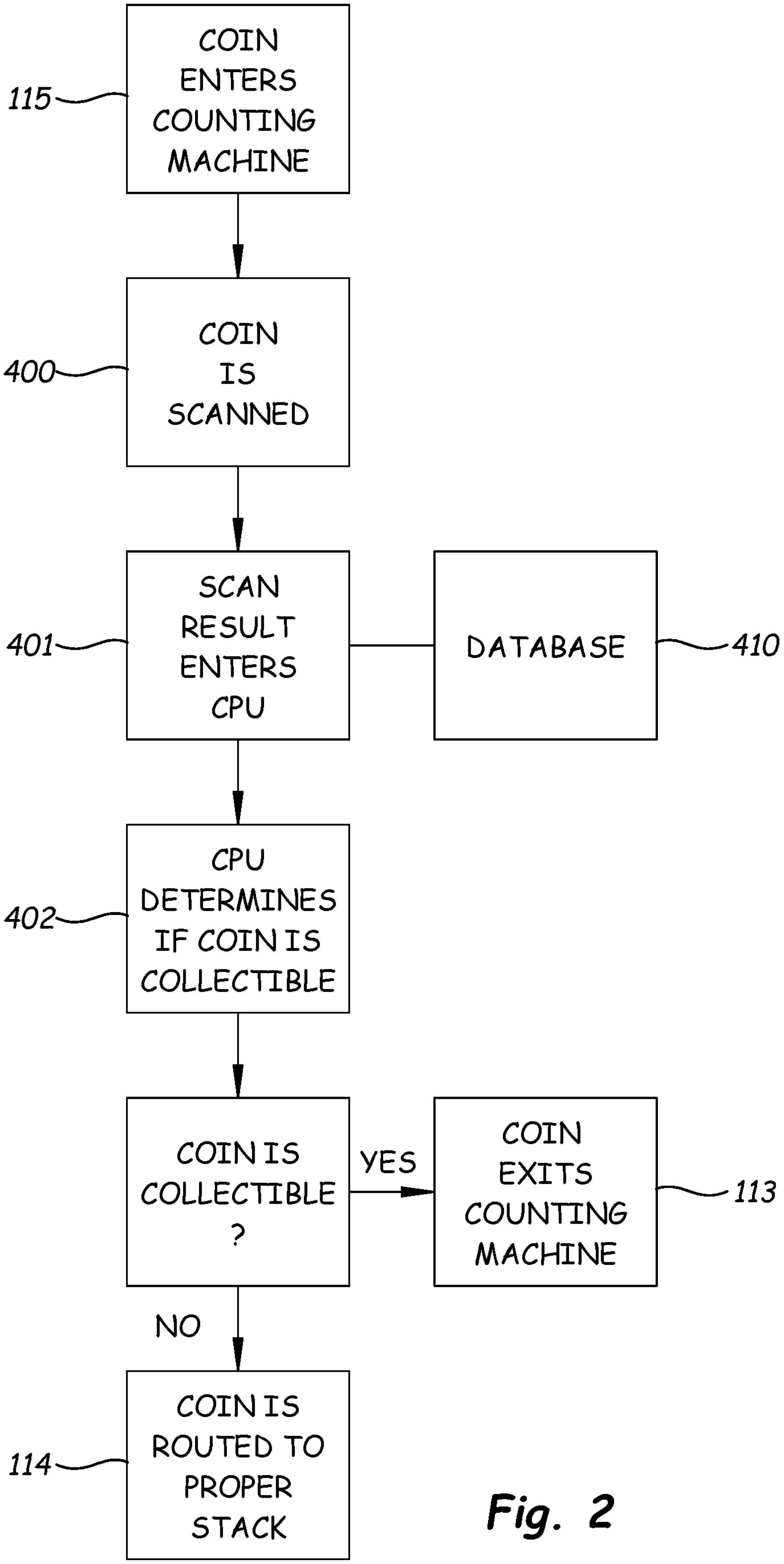
FIG. 2 is a block diagram of a process of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 11.

The rare coin identifying machine 100 (hereinafter invention) is first defined with a housing 101. The housing 101 has a base 102 that is configured to rest on a supporting surface 103. The housing 101 has a cylindrical portion 104 that extends upwardly from the base 102. The cylindrical portion 104 is positioned between the base 102 and a conical portion 105. The conical portion 105 supports a display 106. The conical portion 105 is further defined with a top, opening 107. The top, opening 107 is configured to receive a plurality of coins 200.

Figure 5:
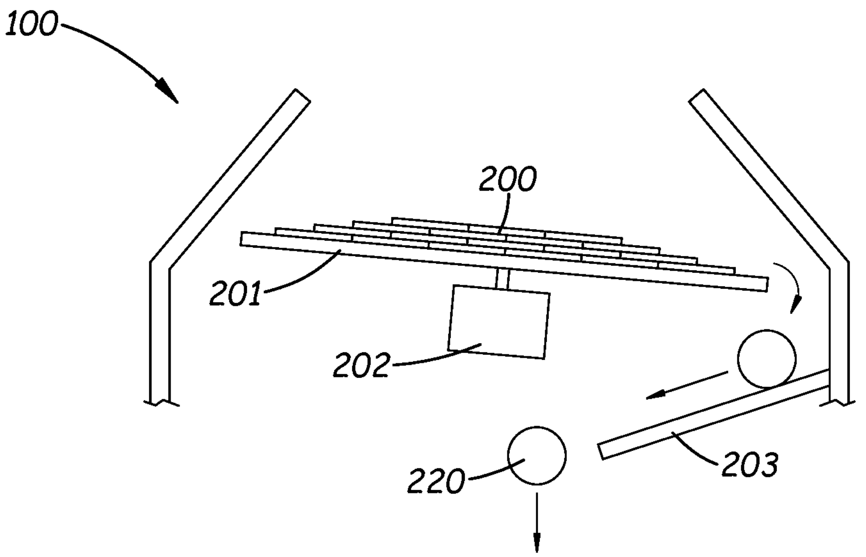
FIG. 5 is another interior view of an embodiment of the disclosure.
Figure 6:
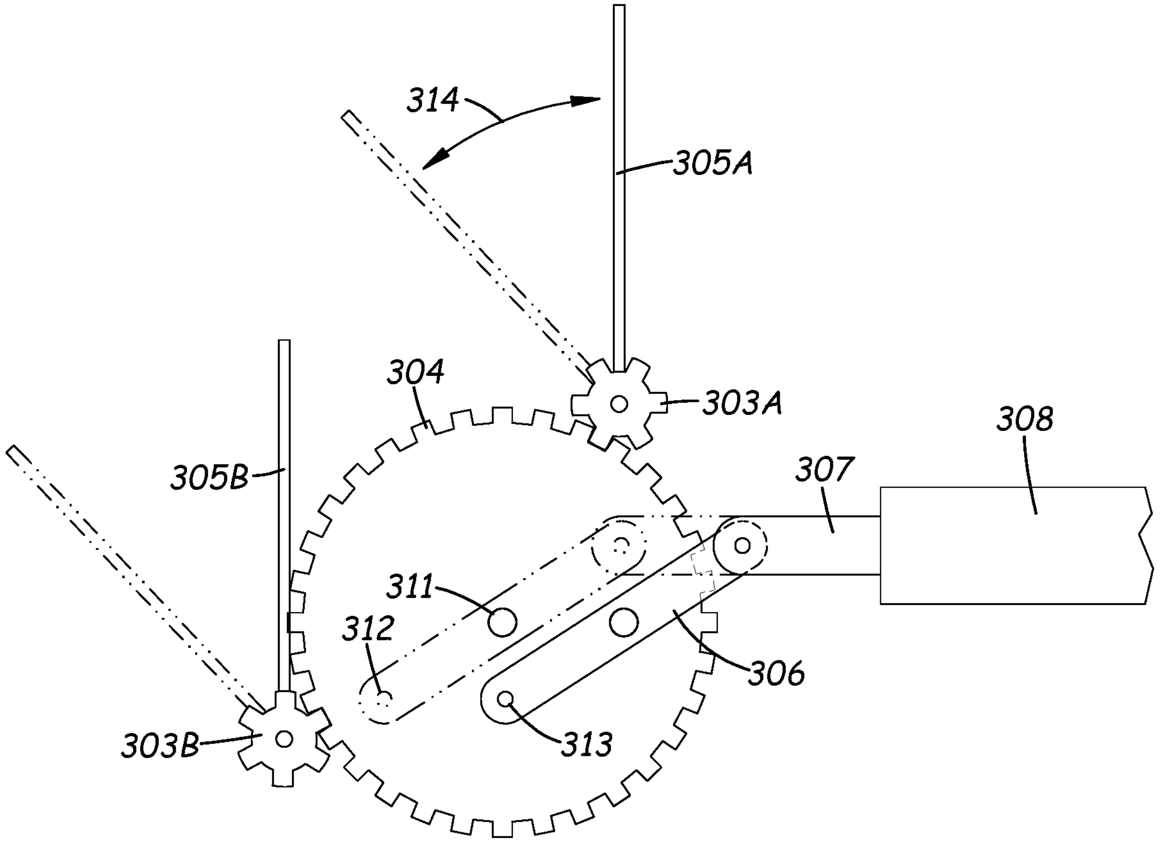
FIG. 6 is a detail view of an embodiment of the disclosure.

The plurality of coins 200 are placed on a rotating plate 201 (see FIG. 5). The rotating plate 201 is positioned inside of the conical portion 105. The rotating plate 201 is rotated via a motor 202 positioned underneath the rotating plate 201. The motor 202 is wired to a CPU 111. The CPU 111 is located within the housing 101. As the rotating plate 201 rotates, the plurality of coins 200 will roll off of the rotating plate 201, and land on a chute 203. The chute 203 has a declination, which assists in rolling a coin 220 of the plurality of coins 200 down the chute 203 (see FIG. 5).

Figure 3:
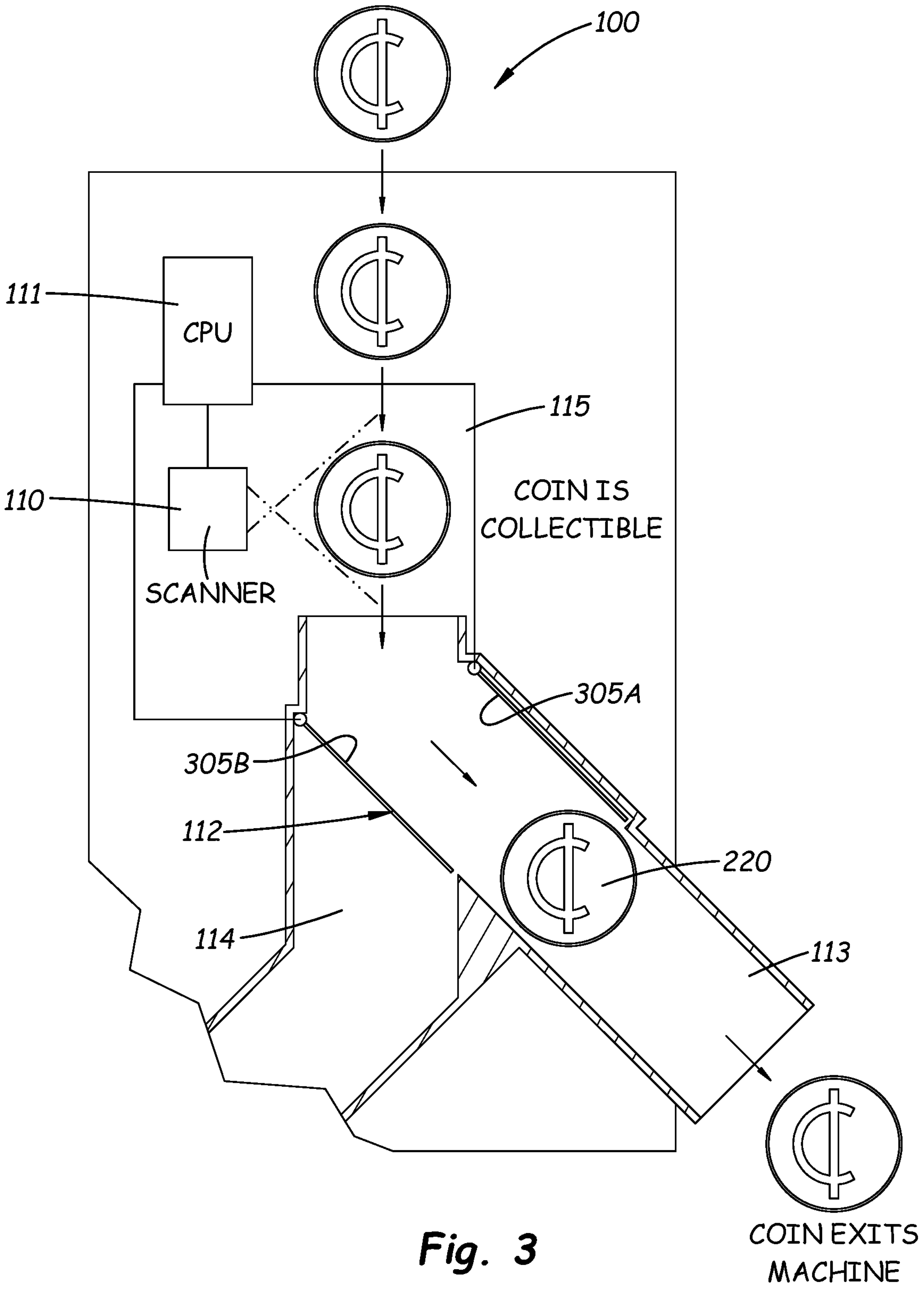
FIG. 3 is a detail view of an embodiment of the disclosure.
Figure 4:
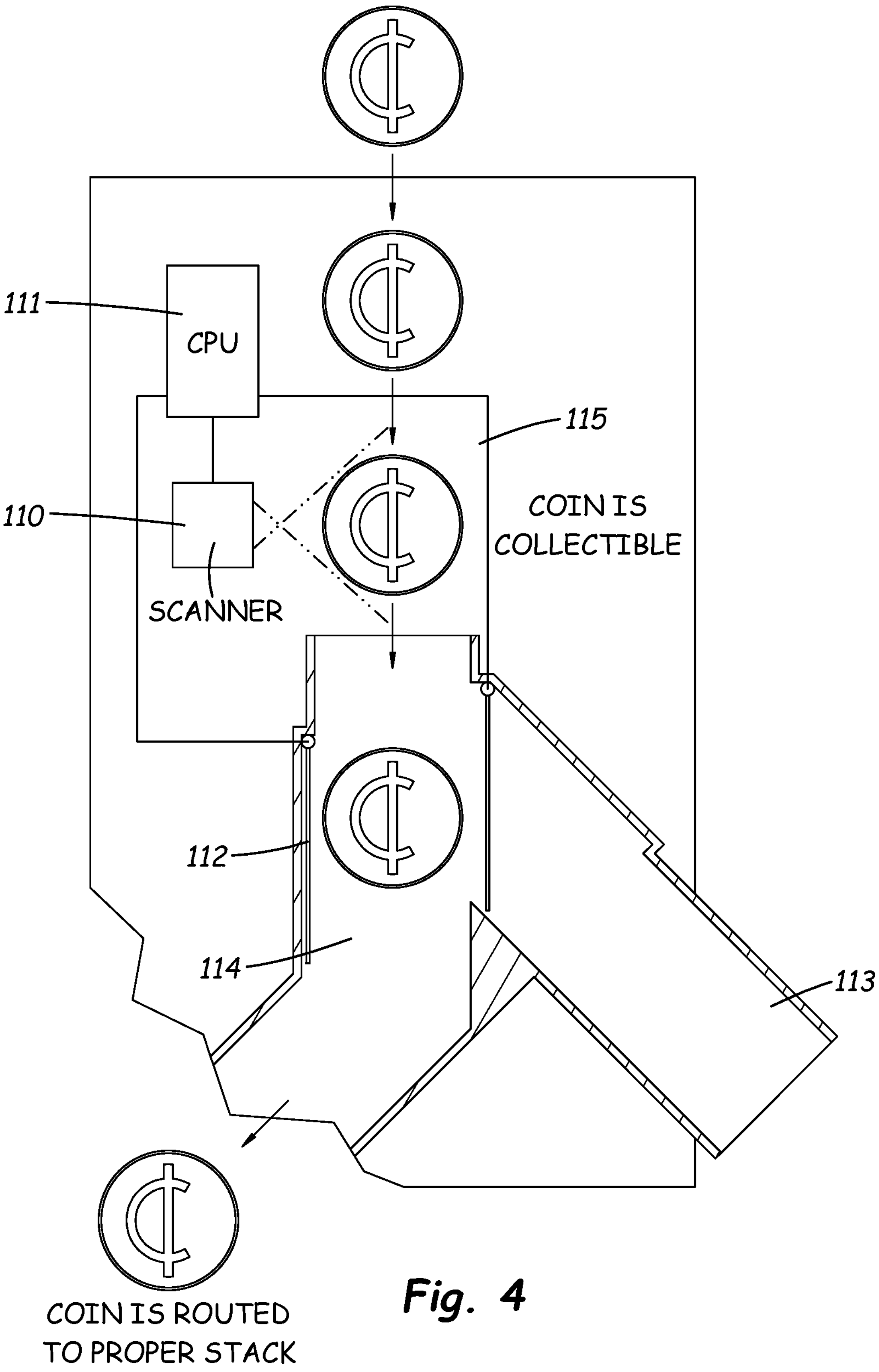
FIG. 4 is another detail view of an embodiment of the disclosure.

When the coin 220 moves through a first region 115, the coin 220 is scanned by the scanner 110 (see FIGS. 3 and 4). This process is referred to as a scanning 400. The result of the scanning 400 by the scanner 110 is inputted 401 into the CPU 106, and the CPU 111 thereafter crosschecks a database 410 to see if a rare coin match occurs. The CPU 111 determines 402 if the coin 220 is collectible 107, and shifts the coin 220 through a first pathway 113 if the coin is considered collectible or through a second pathway 114 if the coin is not a collectible. The CPU 111 directs the pathway through an automated direction pivot 112.

The automated direction pivot pathway 112 includes two gears 303. The two gears 303 are further defined as a first gear 303A and a second gear 303B. The first gear 303A is affixed to a first gate 305A; whereas the second gear 303B is affixed to a second gate 305B.

It shall be noted that the automated direction pivot pathway 112 is used to pivot the first gate 305A and the second gate 305B in concert. This means that the first gate 305A and the second gate 305B move together in concert to switch the automated direction pivot pathway 112 from between the first pathway 113 to the second pathway 114, and vice versa. The first pathway 113 is for use when a rare coin is discovered; whereas the second pathway 114 is for use when the coin 220 is not rare.

The two gears 303 are actuated upon via a drive gear 304. The drive gear 304 moves the two gears 303 (the first gear 303A and the second gear 303B) in concert. The drive gear 304 rotates about a drive axis 311. The drive gear 304 is in mechanical connection with a first linkage 306. The first linkage 306 is in mechanical connection with a solenoid shaft 307. The solenoid shaft 307 extends and retracts from a solenoid 308. The solenoid 308 extends and retracts the solenoid shaft 307 in order to move the first linkage 306 thereby rotating the drive gear 304 (see FIG. 6). The movement of the drive gear 304 via the solenoid 308, rotates the drive gear 304 back and forth between a first position 312 and a second position 313. The first position 312 is offset from the second position 313 via an angle 314. This movement of the drive gear 304 results in the shift between the first pathway 113 and the second pathway 114.

The solenoid 308 is wired via wiring 329 to the CPU 111. The CPU 111 is also wired to a power source 330. The power source 330 may be at least one battery 331 and/or a power cord 332 that plugs into a standard wall outlet 333 (see FIG. 8). The CPU 111 is also wired to the scanner 110 and the display screen 116. It shall be noted that the CPU 111 may have an internal storage capability, which is used to locally store the data needed for the database 410. However, the CPU 111 may need the use of an internet connection via a Wi-Fi transceiver 340 in order to obtain information about rare coins or simply access the database 410 with an Internet connection via the Wi-Fi transceiver 340.

Figure 7:
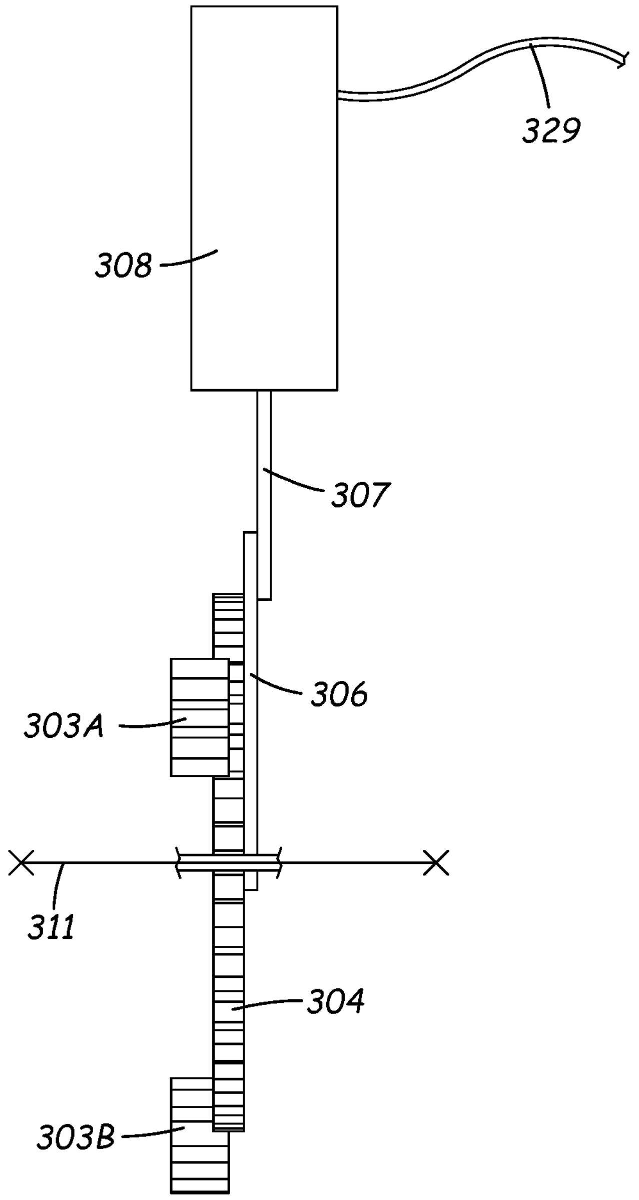
FIG. 7 is a detail view of an embodiment of the disclosure.
Figure 8:
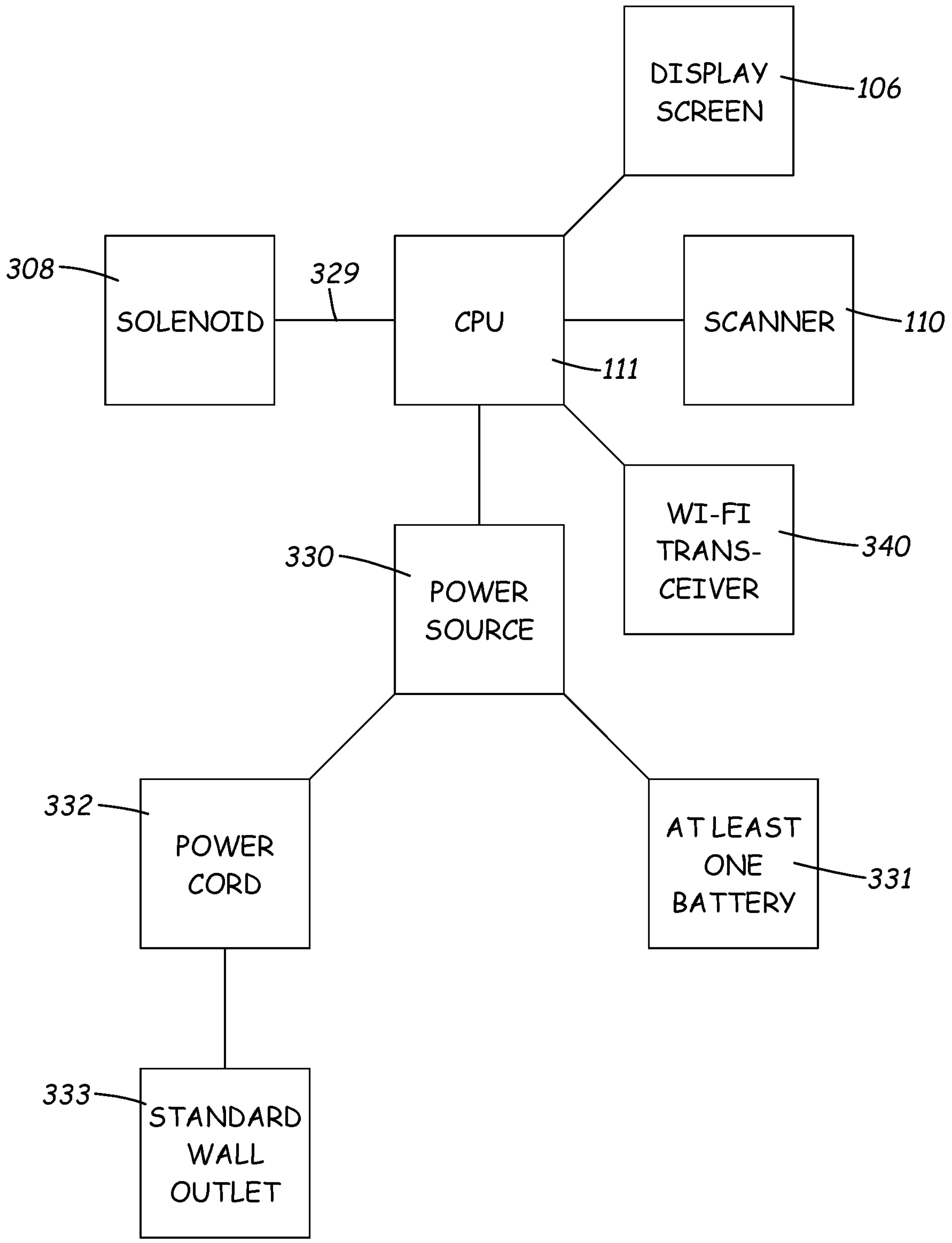
FIG. 8 is a block diagram of an embodiment of the disclosure.
Figure 9:
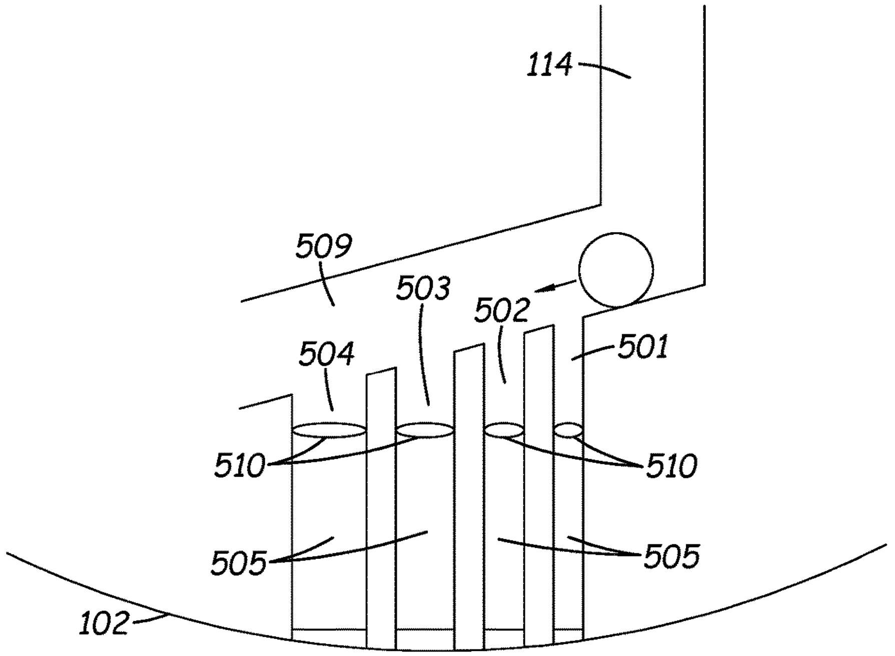
FIG. 9 is a detail view of an embodiment of the disclosure.
Figure 10:
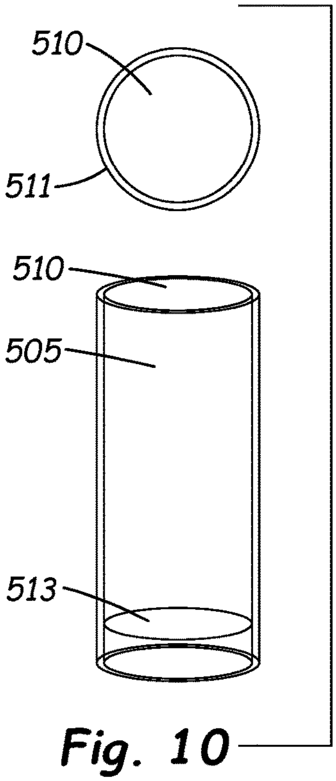
FIG. 10 is a detail view of an embodiment of the disclosure.
Figure 11:
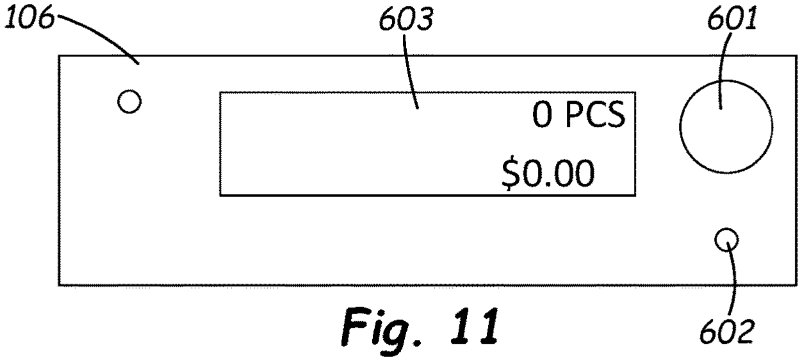
FIG. 11 is a detail view of an embodiment of the disclosure.

If the coin 220 is collectible, the CPU 111 sends a signal to the solenoid to push the solenoid rod forward to which the automated direction pivot 112 rotates and directs the coin to pathway 113 (see FIG. 7). Pathway 113 leads the collectible coin to an exit point on the machine and onto supporting surface 103 (see FIG. 3). If the coin is not a collectible, the CPU does not send a signal to the solenoid to which the automated direction pivot 112 directs the non-rare coin to pathway 114 (see FIG. 4 and FIG. 6).

When the coin 220 is not collectible or rare, the coin 220 falls through pathway 114, the coin will reach third pathway 509. The third pathway 509 is angled along the x and z axis. Once the non-rare coin reaches third pathway 509 it will role down the angled pathway 114 going over a first slide 501, a second slide 502, a third slide 503, and a fourth slide 504. Each slide has a specified length regarding a certain coin's diameter. The first slide 501 has a length with the same diameter as a dime; the second slide 502 for a penny; the third slide 503 for a nickel; and the fourth slide 504 for a quarter. Once the coin 220 reaches their specified slide, the coin 220 will slide down into the hole 510 of their coin collection tube 505. Each collection tube 505 are all the same hole 510 size and length to have the capacity to hold the number of coins that can fit in a standard coin roll. The collection tubes have a solid disk region 513 at the bottom, which is placed in an intrusion hole 512 on the platform region 514 that has the same circumference as solid disk region 513.

The CPU 111 keeps track of how many of the coin 220 are in each collection tube 505. When the number reaches its maximum capacity, the machine stops the checking process by stopping motor 202 and solenoid 308. The screen 106 tells the user to remove the coins from the collection tube 505. The user can remove the coins by lifting the collection tube 505 from the intrusion hole and dumping the coins out from its hole 510.

The screen 106 comprises of a start/stop button 601, a clear button 602, a Liquid-crystal display (LCD) 603, and a colored indication light 604. The start/stop button 601 starts invention 100 by activating 350 the CPU 111. The LCD 603 totals the number of non-rare coins 220 that it has deposited to the collection tubes 505 and the value amount of all the coins 220 processed. The clear button 602 resets the LCD 603 to zero. The colored indication light 604 flashes when a collection tube 505 has reached maximum capacity and needs to be removed. The process starts again when the user presses the start/stop button 602.

Button: As used in this disclosure, a small, sometimes circular object that you press to operate a device or a machine.

Chute: As used in this disclosure, a sloping channel or slide for conveying things to a lower level.

Cylindrical Joint: As used in this disclosure, is a two-degrees-of-freedom kinematic pair used in mechanisms. Cylindrical joints constrain two bodies to a single axis while allowing them to rotate about and slide along that axis.

CPU: As used in this disclosure, runs the operating system and applications, constantly receiving input from the user or active software programs. It processes the data and produces output, which may be stored by an application or displayed on the screen.

Database: As used in this disclosure, a structured set of data held in a computer.

Disk: As used in this disclosure, a flat, thin, round shape.

Drive gear: As used in this disclosure, the member of a pair of gears to which motion and power are transmitted by the other.

Gear: As used in this disclosure, one of a set of toothed wheels that work together to alter the relation between the speed of a driving mechanism and the speed of the driven parts.

Indication light: As used in this disclosure, a light with a colored screen used to notify the user.

Intrusion hole: As used in this disclosure, a protrusion that goes into the surface of a material over a certain distance.

Linkage: As used in this disclosure, a system of solid, usually metallic, links (bars) connected to two or more other links by pin joints (hinges), sliding joints, or ball-and-socket joints to form a closed chain or a series of closed chains.

Liquid-crystal displays (LCDs): As used in this disclosure, a liquid-crystal display is a flat-panel display or other electronically modulated optical device that uses the light-modulating properties of liquid crystals combined with polarizers.

Motor: As used in this disclosure, mechanical or electromechanical devices that convert energy into motion. Energy, in the form of electrical, hydraulic, or pneumatic, is converted to rotational or linear motion.

Pivot: As used in this disclosure, is the central point, pin, or shaft on which a mechanism turns or oscillates.

Rod: As used in this disclosure, a thin straight bar.

Scanner: As used in this disclosure, is a device for examining, reading, or monitoring something.

Shaft: As used in this disclosure, is a long, narrow part or section forming the handle of a tool or club, the body of a spear or arrow, or a similar implement.

Solenoid: As used in this disclosure, is a cylindrical coil of wire acting as a magnet when carrying electric current.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A rare coin identifying machine comprising:

a housing into which a plurality of coins are configured to be inserted;

a CPU connected to a scanner and an automated direction pivot pathway;

wherein an interior of said housing includes the scanner that is configured to scan a coin of the plurality of coins in order to determine if said coin is rare, and valuable;

wherein the housing is configured to sort the plurality of coins by denominations, and expel the coin provided said coin is valuable;

wherein the plurality of coins are placed on a rotating plate;

wherein as the rotating rotates, the plurality of coins roll off of the rotating plate, and land on a chute;

wherein the chute has a declination, which is configured to assist in rolling the coin of the plurality of coins down the chute;

wherein as the coin moves through a first region, the coin is scanned by the scanner;

wherein should the CPU determine that the coin is collectible, the coin is shifted through a first pathway;

wherein if the coin is considered not collectible, the coin is shifted through a second pathway;

wherein the automated direction pivot pathway includes two gears;

wherein the two gears are further defined as a first gear and a second gear;

wherein each side of the automated direction pivot pathway is directly connected to and a part of one of the first and second gears so that each side is mated to a single gear at one end;
wherein the two gears are actuated upon via a drive gear;
wherein the drive gear moves the first gear and the second gear in concert;
wherein the drive gear rotates about a drive axis;
wherein the drive gear is in mechanical connection with a first linkage;
wherein the first linkage is in mechanical connection with a solenoid shaft;
wherein the solenoid shaft extends and retracts from a solenoid;
wherein the solenoid extends and retracts the solenoid shaft in order to move the first linkage thereby rotating the drive gear;
wherein the movement of the drive gear via the solenoid, rotates the drive gear back and forth between a first position and a second position;
wherein the first position is offset from the second position via an angle; and
wherein the movement of the drive gear results in a shift between the first pathway and the second pathway.

2. The rare coin identifying machine according to claim 1,
wherein the housing has a base that is configured to rest on a supporting surface;
wherein the housing has a cylindrical portion that extends upwardly from the base; and
wherein the cylindrical portion is positioned between the base and a conical portion.

3. The rare coin identifying machine according to claim 2,
wherein the conical portion supports a display;
wherein the conical portion is further defined with a top opening; and
wherein the top opening is configured to receive the plurality of coins.

4. The rare coin identifying machine according to claim 3,
wherein the rotating plate is positioned inside of the conical portion; and
wherein the rotating plate is rotated via a motor positioned underneath the rotating plate.

5. The rare coin identifying machine according to claim 4,
wherein the motor is wired to the CPU; and
wherein the CPU is located within the housing.

6. The rare coin identifying machine according to claim 5,
wherein a result of the scanning by the scanner is inputted into the CPU, and the CPU thereafter crosschecks a database to see if a rare coin match occurs; and
wherein the CPU directs the pathway through the automated direction pivot pathway.

7. The rare coin identifying machine according to claim 6,
wherein each side of the first pathway is a first gate and a second gate;
wherein the first gear is affixed to the first gate; and
wherein the second gear is affixed to the second gate.

8. The rare coin identifying machine according to claim 7,
wherein the automated direction pivot pathway is used to pivot the first gate and the second gate in concert.

9. The rare coin identifying machine according to claim 8,
wherein the solenoid is wired via wiring to the CPU; and
wherein the CPU is also wired to a power source.

10. The rare coin identifying machine according to claim 9,
wherein the power source is at least one battery and/or a power cord that plugs into a standard wall outlet.

11. The rare coin identifying machine according to claim 10,
wherein the CPU is also wired to the scanner and the display screen; and
wherein the CPU is wired to a Wi-Fi transceiver in order to obtain information about rare coins or access the database with an internet connection via the Wi-Fi transceiver.

12. The rare coin identifying machine according to claim 11,
wherein if the coin is collectible, the CPU sends a signal to the solenoid to push the solenoid rod forward to which the automated direction pivot rotates and directs the coin accordingly; and
wherein if the coin is not collectible, the CPU does not send a signal to the solenoid to which the automated direction pivot directs the non-rare coin to the second pathway.

13. The rare coin identifying machine according to claim 12,
wherein when the coin is not collectible or rare, the coin falls through the second pathway, and onto a third pathway;
wherein once the coin reaches the third pathway, the coin will roll down the angled pathway going over a plurality of slides; and
wherein the plurality of slides are each defined with a coin diameter.

14. The rare coin identifying machine according to claim 13,
wherein the first slide has a length with the same diameter as a dime;
wherein the second slide has a length with the same diameter as a penny;
wherein the third slide has a length with the same diameter as a nickel; and
wherein the fourth slide has a length with the same diameter as a quarter;
wherein once the coin reaches the specified slide, the coin will slide down into a hole of a coin collection tube; and
wherein each collection tube has a solid disk region at the bottom, which is placed in an intrusion hole on the platform region, and which has the same circumference as the solid disk region.

15. The rare coin identifying machine according to claim 14,
wherein the CPU keeps track of the quantity of the coins in each collection tube.

* * * * *